Figure 1:
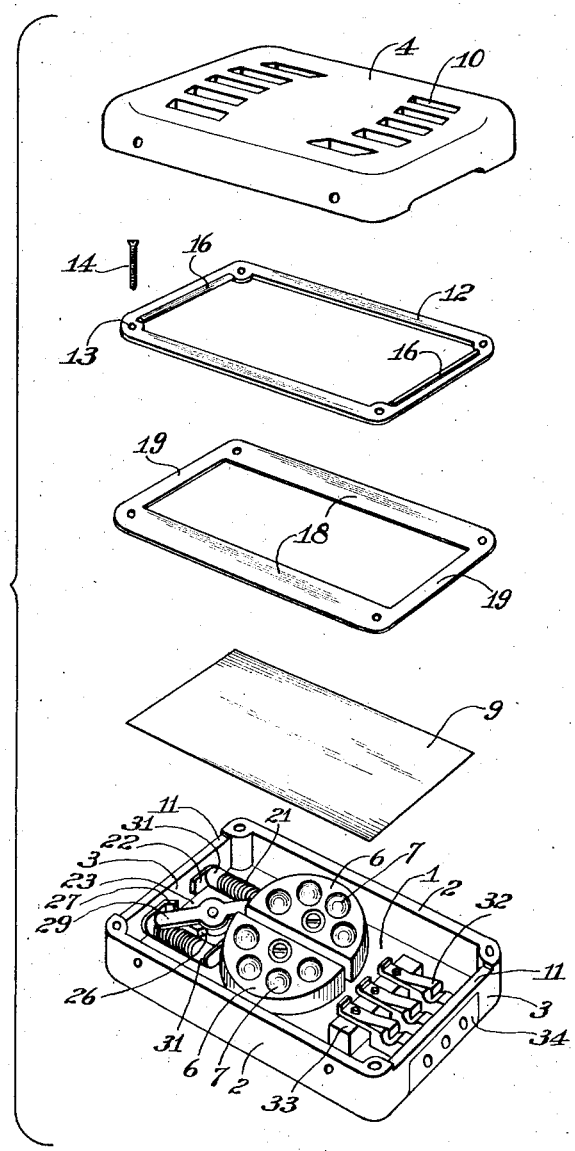

Dec. 17, 1940.　　　S. F. LYBARGER　　　2,224,974
SOUND TRANSMITTER
Filed Nov. 15, 1938　　　3 Sheets-Sheet 1

WITNESSES
A B Wallace.
V. A. Peckham.

INVENTOR.
Samuel F. Lybarger
BY Brown, Critchlow & Flick
his ATTORNEYS.

Dec. 17, 1940.     S. F. LYBARGER     2,224,974
SOUND TRANSMITTER
Filed Nov. 15, 1938     3 Sheets-Sheet 2
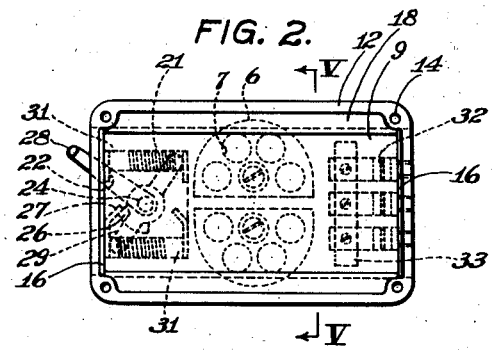
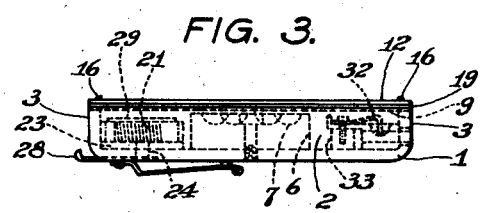
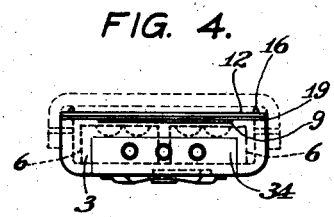
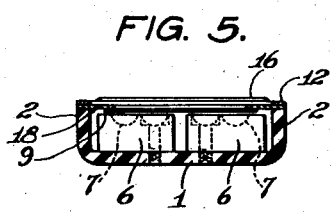
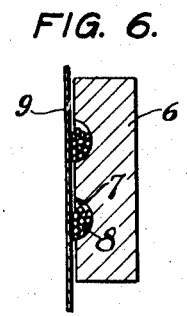
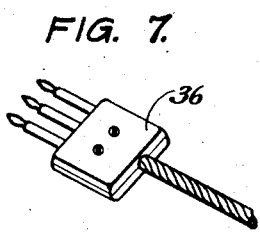
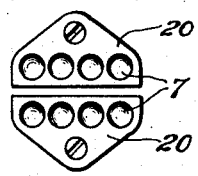
WITNESSES
INVENTOR.
Samuel F. Lybarger
BY Brown, Critchlow & Flick
his ATTORNEYS.

Dec. 17, 1940. S. F. LYBARGER 2,224,974
SOUND TRANSMITTER
Filed Nov. 15, 1938    3 Sheets—Sheet 3
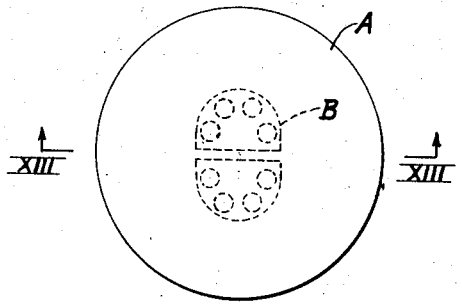
FIG. 9.
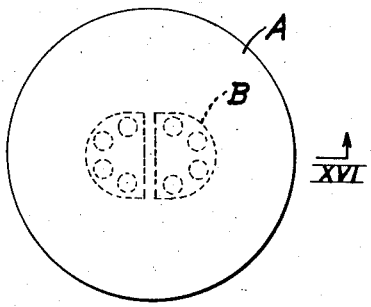
FIG. 10ª.
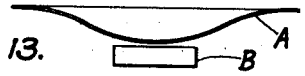
FIG. 13.
FIG. 16.
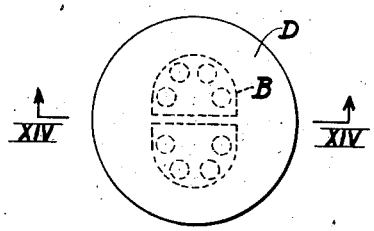
FIG. 11.
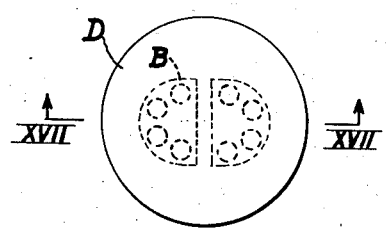
FIG. 10ᵇ.
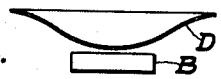
FIG. 14.
FIG. 17.
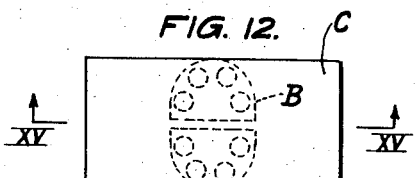
FIG. 12.
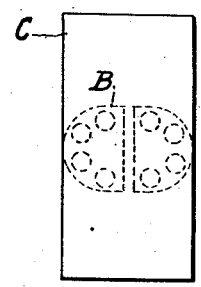
FIG. 10ᶜ.
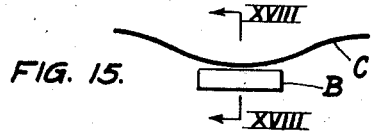
FIG. 15.
FIG. 18.
WITNESSES
OBWallace
V.A. Peckham
INVENTOR.
Samuel F. Lybarger
BY Brown, Critchlow & Flick
his ATTORNEYS.

Patented Dec. 17, 1940

2,224,974

UNITED STATES PATENT OFFICE 2,224,974

SOUND TRANSMITTER

Samuel F. Lybarger, Mount Lebanon, Pa., assignor to E. A. Myers & Sons, Mount Lebanon, Pa., a partnership consisting of Edward A. Myers, Edwin J. Myers, Alfred E. Pelz, and Samuel F. Lybarger Application November 15, 1938, Serial No. 240,463

3 Claims. (Cl. 179—127)

This invention relates to sound transmitters, and more particularly to an improvement in microphones adapted to be used in hearing aid sets for the hard of hearing.

Heretofore it has been the customary practice to use circular diaphragms in hearing aid microphones and the like, the diaphragms being made either of a flat carbon plate approximately 2¼ inches in diameter and about 15 mils in thickness, or of aluminum having substantially the same general dimensions. While numerous attempts have been made to reduce the size of these circular microphones, apparently there has never been any success with such microphones employing diaphragms which are appreciably less than 2 inches in diameter. There are several reasons why circular diaphragm microphones of a smaller size are not satisfactorily produced.

In the first place, the stiffness of such a diaphragm increases rapidly as the diameter is reduced. At the same time the effective mass is reduced with the result that there is a large increase in the resonant frequency of the system in which it is used that throws the range of greatest amplification very much higher in the speech range and causes a marked drop in the low frequency response of the microphone. To reduce the stiffness of diaphragms of this character by decreasing their thickness renders the diaphragms impracticably fragile, especially if made of carbon. Furthermore, any such reduction of thickness lowers the effective mass of the diaphragm still further, and, as a result, partially neutralizes the effect of decreasing the stiffness. Good response over the range from 200 to 3000 cycles is essential in a good hearing aid set, and the portion of this range from 400 to 2000 cycles is in many ways, the most important. If the diameter of a circular diaphragm is reduced to a point where it may be considered a miniature microphone diaphragm, the response in this latter frequency range is especially poor.

Another factor which enters into the situation and is important in determining the acoustical-to-mechanical efficiency of a diaphragm, is the relation to the effective area and effective mass of the diaphragm to its actual area and mass. The effective area of a circular plate diaphragm, clamped at its periphery, for a given central stiffness, is a relatively small fraction of its total actual area, because pressure applied to the portions of the diaphragm near the clamping edge are not very effective in producing central deflection of the diaphragm. Also, the effective central mass is approximately 0.2 of the total mass of the diaphragm. As a result, circular diaphragms must be rather large if they are to be efficient.

In most hearing aid microphones, although not necessarily in all, the sensitive relay action is secured by the motion of the diaphragm against small carbon particles placed in suitable cups in one or more carbon blocks or backplates spaced a short distance from the back of the diaphragm. These carbon blocks are generally from ¾ of an inch to 1 inch in diameter. As is well known, the maximum amplitude of a circular plate in vibration at its fundamental mode is at or near its center, and decreases as the distance away from the center is increased. Therefore, from the standpoint of sensitivity, it is of considerable advantage to have the carbon cups as close to the center of the diaphragm as possible to take advantage of the maximum vibration region of the diaphragm. In any microphone using a circular diaphragm of fairly large diameter, the distance of the outermost carbon particles from the center of the diaphragm is not sufficient to place them in a zone where the amplitude of the diaphragm has decreased very much. As the diameter of the diaphragm is decreased, however, the amplitude of vibration at the outer carbon particles becomes less and less until it may be only one-half or one-third of the amplitude at the center because the outer particles come so close to the fixed edge of the diaphragm which has zero amplitude. The sensivitity of a microphone containing such a diaphragm is therefore correspondingly decreased.

One of the primary objects of this invention is to provide a hearing aid microphone which is considerably smaller in size than those heretofore used, and consequently is less conspicuous, more pleasing in appearance, and easier to wear and handle.

Another object is to provide a microphone of this type in which the most effective use is made of that portion of its diaphragm in which the maximum amplitude of vibration occurs.

A further object is to provide a microphone which, although smaller in size than those heretofore provided, is adapted to contain a volume control that eliminates the necessity for a separate volume control in the line of the hearing aid set.

It is also an object to provide for so damping a microphone diaphragm as to obtain improvement in speech quality.

Another object is to provide a microphone diaphragm which has subtsantially the same acoustical and mechanical properties as prior circular diaphragms having approximately twice as great an area.

A still further object is to provide a microphone of this character having a more uniform frequency response, and a wider frequency range.

In accordance with this invention the foregoing objects are accomplished by the use of an elongate diaphragm, preferably rectangular, which is clamped only at its ends in a case of suitable shape containing a microphonic unit in the center. The sides of the diaphragm are spaced from the sides of the case so that the diaphragm is free to vibrate along substantially the entire length of its side edges. The body of air surrounding the diaphragm is prevented from flowing around the edges from one side to the other by flexible sealing strips that connect the side edges of the diaphragm to the case and also serve to dampen the vibrations of the diaphragm to more accurately reproduce the sound waves striking it. Preferably, a combined volume control and switch is mounted in the case between one end and the microphone unit, and circuit jacks are mounted in the opposite end of the case.

The invention is illustrated in the accompanying drawings of which Fig. 1 is an exploded view of my microphonic transmitter showing the parts arranged in the order in which they are assembled; Figs. 2, 3 and 4 are plan, side and end views, respectively, of the microphone with the cover removed; Fig. 5 is a transverse section taken on the line V—V of Fig. 2; Fig. 6 is an enlarged fragmentary sectional view taken through the diaphragm and back-plates in operative position; Fig. 7 is a perspective view of a circuit plug; and Fig. 8 is a plan view of a modified form of backplate; Figs. 9, 11 and 12 show, for comparative purposes, three different microphone diaphragms; Figs. 10a, 10b and 10c show the same diaphragms rotated on their axes 90°; Figs. 13, 14 and 15 are sectional views taken on the lines XIII—XIII, XIV—XIV and XV—XV, respectively, of Figs. 9, 11 and 12 and indicating in an exaggerated manner the amplitude curve of each diaphragm above the backplate associated therewith; and Figs. 16, 17 and 18 are similar sectional views taken on the lines XVI—XVI, XVII—XVII and XVIII—XVIII, respectively, of Figs. 10a, 10b and 15.

Referring to the first six figures of the drawings, the case of the microphone is preferably of oblong shape and consists of a base 1 having side and end walls 2 and 3, and a cover 4 that telescopes over the walls of the base to which it may be detachably connected by tiny screws (not shown). The base may be made of a molded plastic, or of metal, such as aluminum. Mounted on the central portion of the base is a pair of spaced carbon backplates or blocks 6 insulated from each other in any suitable manner and each of which may be substantially semi-cylindrical with its straight edge extending longitudinally of the base near its center. Each of these blocks is provided in its upper surface with a plurality of hemispherical cups 7 in which a plurality of minute carbon granules or globules 8 are loosely disposed (Fig. 6). The globules are held in the cups by a diaphragm 9 of carbon or metal extending across the top of the blocks a short distance therefrom and lightly engaging the globules projecting from the cups.

Sound waves passing through openings 10 of the cover and striking the diaphragm cause it to vibrate, thereby continuously varying the pressure on the carbon globules in the cups of the carbon blocks. As is well known, such variations in pressure cause variations in the resistance that the globules offer to passage of electricity from one backplate to the diaphragm and from the latter to the other backplate, thus varying the current in the microphone circuit. The openings or slots 10 in cover 4 are so designed that they give a maximum resonant effect, in combination with the volume of air between the cover and diaphragm, at a frequency somewhere between about 1500 and 5000 cycles, as desired. In place of providing the cover with slots 10, it may be made oversize and spaced from the walls of the base in any suitable manner to form an "inverted" microphone in which the sound waves enter the space between the cover and diaphragm by passing in between the cover and base walls.

It is a feature of this invention that the diaphragm is elongate, preferably rectangular, and somewhat narrower than the case whereby its side edges are spaced inwardly from side walls 2. To center this strip-like diaphragm between the side walls of the base, the end walls 3 are provided with centrally-located shallow recesses 11 (Fig. 1) that receive the ends of the diaphragm. These recesses are of such depth that the top of the diaphragm is substantially flush with the top of the side and end walls. The diaphragm is preferably clamped in place by means of a rigid rectangular rim 12 having holes 13 in its corners for receiving screws 14 (Fig. 1) that detachably connect the rim to the corners of the base. The ends of the rim may be provided with a rib 16 for strengthening them so that they will always lie flat against the ends of the diaphragm in recesses 11.

To prevent air from passing around the side edges of the diaphragm from one surface to the other and thereby diminishing the intensity of the vibrations of the diaphragm, the spaces between the side edges of the diaphragm and the side walls of the base are sealed by flexible strips 18 connected thereto. These strips may be varnished silk or the like, and are preferably connected together at their ends by integral end pieces 19 so that a rectangular gasket-like member is formed. The side strips 18 are cemented or glued to the side edges of the diaphragm, and their outer edges and end pieces 19 are clamped against the walls of the base by means of clamping rim 12.

Another advantage of flexible strips 18 is their damping effect. Although these strips do not appreciably increase the stiffness of the diaphragm, they do add a certain amount of resistance to its motion. This resistance is approximately proportional to the velocity of the side edges of the diaphragm, and tends to dampen out the continued vibrations of the diaphragm, whereby the speech waves that impinge against the surface of the diaphragm are more accurately reproduced.

In a strip diaphragm of the type described, having the same central stiffness as a circular diaphragm, the area can be considerably smaller than that of the circular diaphragm and yet produce an equal central deflection under a given pressure. This is because the rectangular diaphragm is free along two opposite edges, and the contribution to the central deflection produced by pressure on portions of the diaphragm at a given relative distance from the center is greater than for the circular type. As a result, the size of a diaphragm of the strip-type can be materially reduced, whereby a smaller and lighter microphone can be produced. The diaphragm disclosed herein is preferably substantially 1 inch by 2 inches by .015 of an inch thick. The longest dimension of the diaphragm is thus less than the diameter of a satisfactory circular diaphragm, and since the vibration of the strip is substantially uniform across its shorter dimension, the location of the backplates at the center of the diaphragm results in making more effective use of the vibration amplitude of the diaphragm. This fact is illustrated diagrammatically in Figs. 9 to 18 wherein Fig. 9 shows a circular diaphragm A, and the broken line B at its center represents backplates. Fig. 10a shows the same diaphragm turned on its axis 90°, while Figs. 13 and 16 illustrate in an exaggerated manner the amplitude curve of the diaphragm in each case, when its center portion is flexed down toward the backplates by a sound wave. Figs. 12, 15, 10c and 18 are intended to show the same thing, except that the diaphragm C is rectangular with about half the area of diaphragm A.

It will be noted that the curves of the diaphragms in Figs. 13 and 15 are substantially the same, but that there is no curve in Fig. 18. The result is that a strip diaphragm microphone is more sensitive than a circular microphone because the amplitude of the diaphragm at each cup position taken transversely of the diaphragm is substantially the same, rather than diminishing toward the edges of the diaphragm as in a circular diaphragm.

The greater sensitivity of a microphone utilizing the strip diaphragm is even more evident when compared with a circular diaphragm D of the same area, as shown in Figs. 11, 14, 10b and 17. The diaphragm curve (Fig. 14) is sharper than those of Figs. 13 and 15, because the diameter of the diaphragm is less than that of the one shown in Fig. 13 and less than the length of the strip diaphragm. The amplitude curve in Fig. 17 is sharper than that of Fig. 16 for the same reason, and differs from the substantially straight line of Fig. 18 because the circular diaphragm is clamped around its entire edge while the side edges of the strip diaphragm are unconfined and free to move with its central portion.

Since a greater portion of the diaphragm vibrates with a larger amplitude, for a given central amplitude, than is the case with a circular diaphragm, the effective mass of the strip-type diaphragm is greater than that of a circular diaphragm of equal area and thickness. The effective mass of the strip diaphragm is approximately three-eighths of its total mass, while the effective mass of a circular diaphragm is approximately two-tenths of its total mass. Consequently, although the strip diaphragm has a much smaller area, it has approximately the same mass in vibration as a large circular diaphragm. The importance of this is that it allows the system to be resonant at a more desirable point in the frequency spectrum.

As the strip-type diaphragm of this invention is clamped only at its ends, it has a fairly low stiffness considering its relatively small area without being excessively thin or fragile, and the result is that its low frequency response is not seriously impaired. In other words, as the side edges of the diaphragm are not rigidly connected to the casing, the diaphragm has increased vibratory characteristics in the area overlying the carbon cells. This gives a more uniform frequency response and a wider frequency range. Although flexible strips 18 prevent flow of air around the side edges of the diaphragm, they allow the long side edges of the diaphragm to vibrate freely. The volume of air enclosed behind the diaphragm has a very material effect on its stiffness, so the volume of the space behind the diaphragm should be chosen to give the correct total stiffness.

It will have been gathered from the foregoing description that a strip diaphragm 1″ x 2″ compares very favorably in mechanical and acoustical properties with a circlular diaphragm of about 2¼ inches in diameter, the two having equal thicknesses. A strip diaphragm of the size mentioned, however, will have only about half the area of the circular diaphragm.

The results obtainable with the large 2¼ inch circular diaphragm have proven quite satisfactory in the manufacture of hearing aid microphones, and almost the same results are obtainable with the very much smaller rectangular diaphragm. The actual measurements of the performances of the two types of microphones indicate that the performance of the strip diaphragm microphone is very close to that of the circular one.

The frequency response characteristics of the small microphone are even better than those of the larger circular microphone. A microphone of the type described, with a 1″ x 2″ diaphragm, has given reasonably uniform response up to about 5000 cycles, whereas the usual larger circular microphone has a large drop in response at about 3000 cycles. Part of this difference may be explained by the fact that the small diaphragm vibrates in its fundamental mode to a higher frequency than is the case with the other diaphragm. The second mode of vibration is very ineffective because the amplitude at the center of the diaphragm, for both the circular and the rectangular types, is zero.

If it is assumed that the same fundamental resonant frequency is present in the two types of microphones, then the advantage of the strip diaphragm microphone is apparent when the ratios of the first and second frequencies of vibration are considered. With the strip-type diaphragm, the ratio of the second natural frequency to the first natural frequency is considerably higher than for the circular type diaphragm as calculated from the theory of vibration of a clamped circular plate and clamped bar.

To make even more effective use of the amplitude characteristics of the strip diaphragm, the type of backplates shown in Fig. 8 may be used. The principal feature of these backplates 20 is that the cups 7 are located in a straight row adjacent the center side of each carbon block. With this construction and with the parallel center sides of the blocks extending transversely of the diaphragm, the cups can be placed very close to the point of maximum vibration of the diaphragm.

It has been found that the rectangular shape of the microphone makes it more attractive in appearance and also easier to wear and to handle. It also makes it easy to conceal on the person, which is quite an important point in a hearing-aid microphone. Another advantage of the rectangular microphone case is that there is a convenient rectangular space at its ends beyond the carbon blocks to house circuit jacks, rheostats and switches for the microphone and an amplifier unit when used. The combined volume control and switch preferably comprises a pair of spaced parallel resistances 21 formed by winding resistance wire on fiber cores secured between upturned lugs 22 of a plate 23 attached to base 1. Journaled in the base between these resistances is a shaft 24 which carries at its inner end a fiber disc provided with a segment 26 adapted to engage stops 27 on the ends of the lugs holding one of the resistances to limit the distance the shaft can be turned by a lever 28 attached to its outer end (Fig. 2). The fiber disc carries a pair of contact arms 29 spaced from the shaft and extending radially in opposite directions for engaging the two resistances. The resistance cores are not wound for their full length, whereby there remain bare portions 31 onto which the contact arms can be moved to break the circuit.

In the opposite end of the case three jacks 32 are mounted at their inner ends on an insulating block 33 secured to the base, the outer ends of the jacks being disposed in an insulating block 34 which is set into a recess in the end wall of the case. One of the jacks is connected by a wire (not shown) to one of the two carbon blocks, the other of which is connected to one of the resistances 21. Another jack is connected to the other resistance, and the remaining jack is connected in any suitable manner to the contact arms. Consequently, two circuits are adapted to be formed, i. e., a microphone and an amplifier circuit, with a combined rheostat and switch for each circuit. A two circuit plug 36, shown in Fig. 7, is used with the three jacks to help complete the circuits.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A microphone comprising a substantially rectangular case having side and end walls, a substantially rectangular diaphragm having its ends resting on said end walls and its side edges spaced inwardly from said side walls, said end walls being provided with recesses for receiving the diaphragm and supporting it with its outer surface substantially flush with the free edges of the walls, flexible sealing means connecting the side edges of the diaphragm to the side walls of the case and overlying the side edges and ends of the diaphragm, and means for clamping said sealing means and diaphragm ends against the walls of the case, said diaphragm having sufficient stiffness and mass to produce high response in the principal part of the speech frequency range and to produce the principal resonance between 1000 and 3000 cycles.

2. A microphone comprising a substantially rectangular case having side and end walls, a substantially rectangular diaphragm having its ends resting on said end walls and its side edges spaced inwardly from said side walls, a microphonic unit mounted in the center of the case, said unit being provided with cups only adjacent the central transverse axis of the diaphragm, said cups being disposed in two parallel rows extending transversely of the diaphragm, a plurality of carbon granules in each of said cups with the outer granules in contact with the diaphragm, means for connecting said cups in an electric circuit, the vibrations of the diaphragm varying its pressure on the granules whereby the resistance that they offer to the flow of electricity in said circuit is varied, and flexible sealing members connecting the side edges of the diaphragm to the side walls of the case, said diaphragm having sufficient stiffness and mass to produce high response in the principal part of the speech frequency range and to produce the principal resonance between 1000 and 3000 cycles.

3. A microphone comprising a case, a substantially rectangular diaphragm having its ends resting on said case and its side edges spaced therefrom, flexible members connected to said side edges and extending outwardly to said case for sealing the space between them whereby the diaphragm is free to vibrate along substantially the entire length of its side edges, a pair of electricity-conducting blocks mounted in the center portion of the case, means for connecting the blocks in an electric circuit, each of said blocks being provided with a substantially straight line of cups extending transversely of the diaphragm near its center, and a plurality of carbon granules disposed in each cup with the outer ones engaging the diaphragm whereby the vibrations of the diaphragm vary its pressure against the granules and thus vary the resistance that the granules offer to the flow of electricity in said circuit.

SAMUEL F. LYBARGER.